United States Patent [19]

Ishima

[11] Patent Number: 4,494,178
[45] Date of Patent: Jan. 15, 1985

[54] POWER SUPPLY CIRCUIT

[75] Inventor: Kazumi Ishima, Kashiwa, Japan

[73] Assignee: Ricoh Company, Ltd., Japan

[21] Appl. No.: 442,266

[22] Filed: Nov. 17, 1982

[30] Foreign Application Priority Data

Nov. 19, 1981 [JP] Japan .................... 56-185696

[51] Int. Cl.³ .......................... H02M 3/335
[52] U.S. Cl. ...................... 363/21; 363/37;
    363/41; 363/80; 363/26
[58] Field of Search ......... 363/20, 21, 26, 37,
    363/41, 79, 80, 96, 97

[56] References Cited

U.S. PATENT DOCUMENTS

| | | | |
|---|---|---|---|
| 4,228,493 | 10/1980 | de Sartre et al. | 363/21 X |
| 4,322,817 | 3/1982 | Kuster | 363/26 |
| 4,330,816 | 5/1982 | Imazeki et al. | 363/26 X |
| 4,400,767 | 8/1983 | Fenter | 363/21 |

Primary Examiner—William M. Shoop
Attorney, Agent, or Firm—Guy W. Shoup

[57] ABSTRACT

A switching regulator includes a first full-wave rectifier for rectifying an input a.c. voltage, at least one power switch connected between the first rectifier and the primary winding of a pulse transformer whose secondary winding is connected through a second full-wave rectifier and a filter to a pair of output terminals across which a regulated d.c. output voltage appears, and a control circuit comprised of a level-shift circuit, a comparator and a pulse width modulator for controlling the on/off condition of the power switch, whereby the pulse width modulator supplies a pulse modulated signal to turn the power switch on only when the comparator supplies a high level signal to the pulse width modulator.

18 Claims, 18 Drawing Figures

Fig. 4
(a) $V_1$
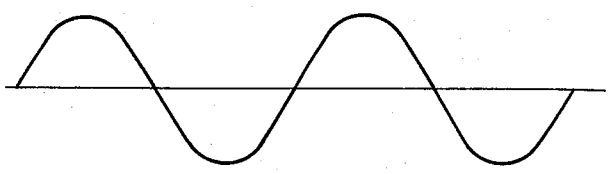
(b) $V_2 \cdot \dfrac{R_2}{R_1+R_2}$  $V_{TH1}$  $V_{TH2}$
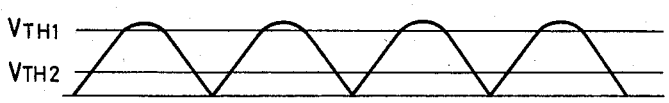
(c) $V_3$
(d) $V_{ref} - V_s$
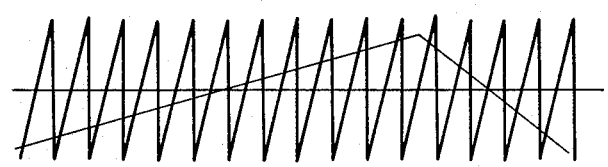
(e) PWM OUTPUT A
(f) PWM OUTPUT B
(g) $V_5$
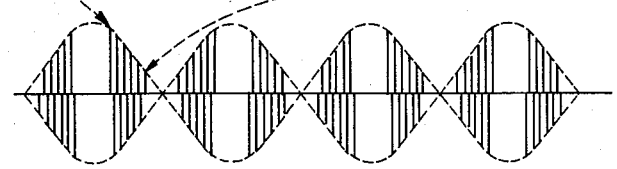
(h) Rectified $V_5$
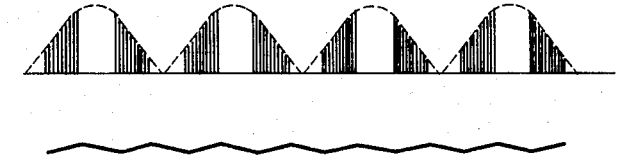
(i) $V_{out}$

POWER SUPPLY CIRCUIT

BACKGROUND OF THE INVENTION

1. Field of the Invention

This invention relates to a power supply circuit, and in particular to a switching regulator for converting an alternating current voltage into a regulated direct current voltage to be used as a source of electrical energy for driving a desired electrical circuit.

2. Description of the Prior Art

In general, in a power supply circuit for converting a commercial line alternating current power source into a d.c. voltage, use is usually made of a transformer to either step up or step down the voltage level of the commercial line power source and/or to electrically isolate the output terminal of the power supply circuit from its input terminal to which the commercial line power is applied. In order to make such a transformer to be used in a power supply circuit smaller in size and lighter in weight as well as to enhance the power efficiency of power supply circuit, there has recently been proposed a switching regulator according to which a commercial line voltage is applied to the primary winding of a pulse transformer through a switching circuit and the voltage induced at the secondary winding is applied to the output terminal after having been suitably rectified and filtered whereby the switching circuit is turned on or off with the timing determined by the output voltage at the output terminal so that a constant d.c. output voltage may be obtained at the output terminal.

However, in prior art switching regulators, the switching operation takes place once in each positive or negative half cycle of the alternating commercial line voltage, so that the period of switching is relatively long. For this reason, the filter circuit connected to the secondary winding of the pulse transformer cannot be made compact in size. Moreover, since the transmission of power from the primary side to the secondary side of the pulse transformer is limited by the once-for-each-half cycle switching time period, i.e., the time period while the primary side is on, an attempt to obtain a relatively large output power necessarily makes the switching time period longer, which, in turn, makes an exciting current at the primary side larger thereby precluding the possibility of using an even smaller transformer to make the whole device appropriately compact in size.

SUMMARY OF THE INVENTION

The above-described disadvantages of the prior art are overcome with the present invention and an improved switching regulator is herein provided.

A primary object of the present invention is to provide an improved power supply circuit for supplying a regulated d.c. voltage converted from a raw a.c. voltage.

Another object of the present invention is to provide a switching regulator which may be made by far more compact in size and lighter in weight than the prior art.

A further object of the present invention is to provide an improved switching regulator including a pulse transformer which is substantially smaller than those used in prior art regulators.

A still further object of the present invention is to provide an improved switching regulator in which a compact-sized filter circuit may be used.

Other objects, advantages and novel features of the present invention will become apparent from the following detailed description of the invention when considered in conjunction with the accompanying drawings.

BRIEF DESCRIPTION OF THE DRAWINGS

FIGS. 4 (a) through (i) are waveform diagrams useful for explaining the operation of the circuit shown in FIG. 3.

DESCRIPTION OF THE PREFERRED EMBODIMENTS

Figure 1:
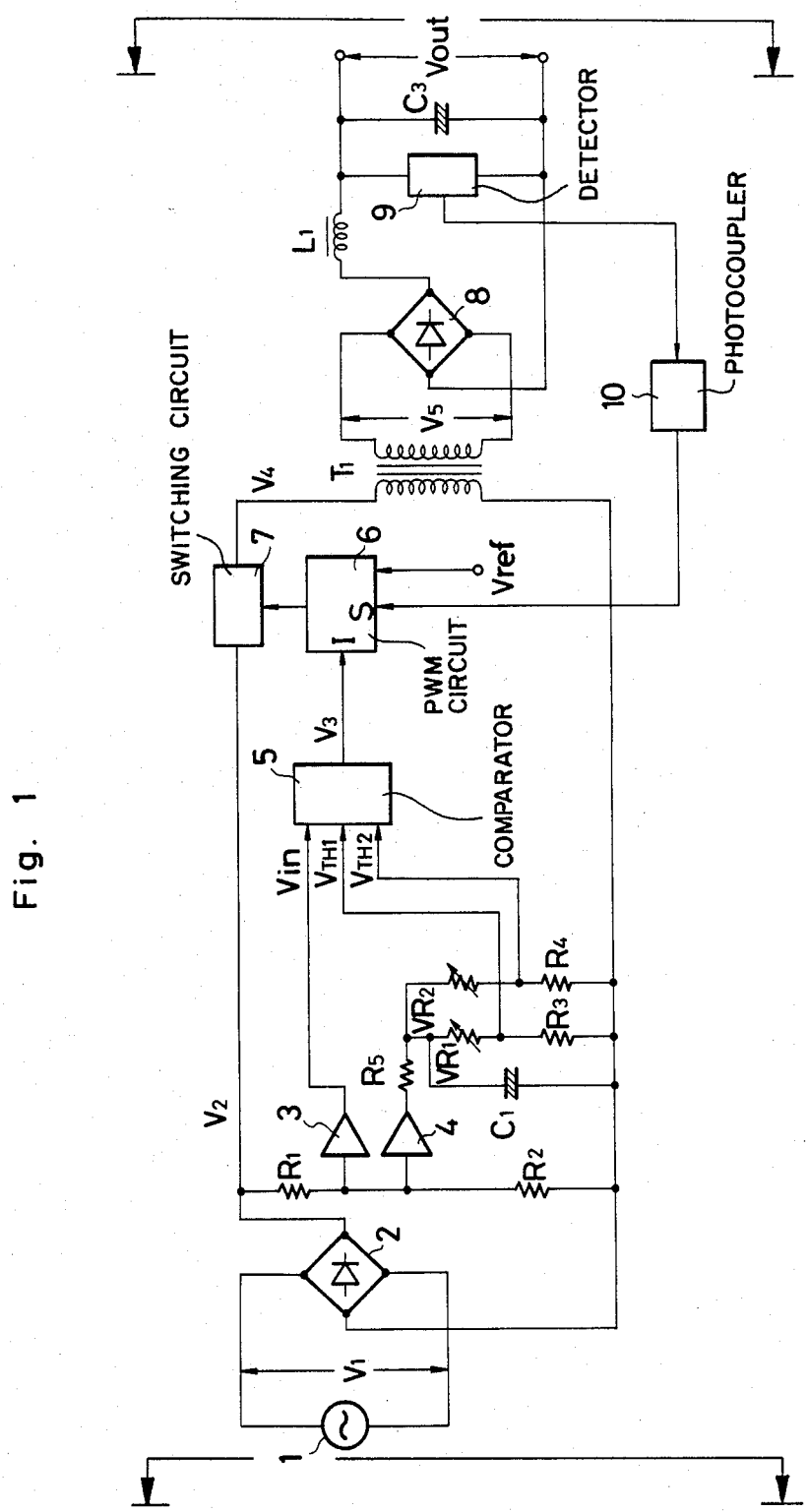
FIG. 1 is a circuit diagram showing the switching regulator constructed in accordance with one embodiment of the present invention.

Referring now to FIG. 1, there is shown a switching regulator constructed in accordance with one embodiment of the present invention, comprising an input full-wave rectifier 2 which rectifies the input voltage $V_1$ as received from a commercial line power source 1 and applies the thus rectified voltage $V_2$ to a voltage divider comprised of resistors $R_1$ and $R_2$. As shown, in this embodiment, use is made of a diode bridge rectifier as the full-wave rectifier 2. The waveforms of the a.c. input voltage $V_1$ and the rectified voltage are shown in FIGS. 2(a) and 2(b), respectively.

Also provided is a buffer amplifier 3 having its input connected to the junction between the resistors $R_1$ and $R_2$ and its output connected to one input of a window comparator 5. The buffer amplifier 3 receives the divided voltage of $V_2$ and supplies at its output a voltage $V_{in} = V_2 \cdot R_2/(R_1 + R_2)$. There is also provided the other buffer amplifier 4 having its input connected to the junction between the resistors $R_1$ and $R_2$ and its output connected to one side of the resistor $R_5$ the other side of which is connected to two pairs of voltage dividers each comprised of a variable resistor $VR_1$ or $VR_2$ and a resistor $R_3$ or $R_4$, respectively, and also to a one plate of a capacitor $C_1$ whose the other plate is connected to the bottom side of the resistor $R_2$. As a result, the output voltage from the buffer amplifier 4 is filtered by the combination of the resistor $R_5$ and the capacitor $C_1$ and then the thus filtered voltage is divided by each of the two voltage dividers, i.e., a $VR_1$ and $R_3$ combination and a $VR_2$ and $R_4$ combination, to provide threshold voltages $V_{TH1}$ and $V_{TH2}$ as input voltages to the two remaining inputs of the comparator 5. It is to be noted that the pair of voltage dividers are so adjusted to provide the threshold voltages $V_{TH1}$ and $V_{TH2}$ with the relation that $V_{TH1}$ is larger than $V_{TH2}$.

Figure 2:
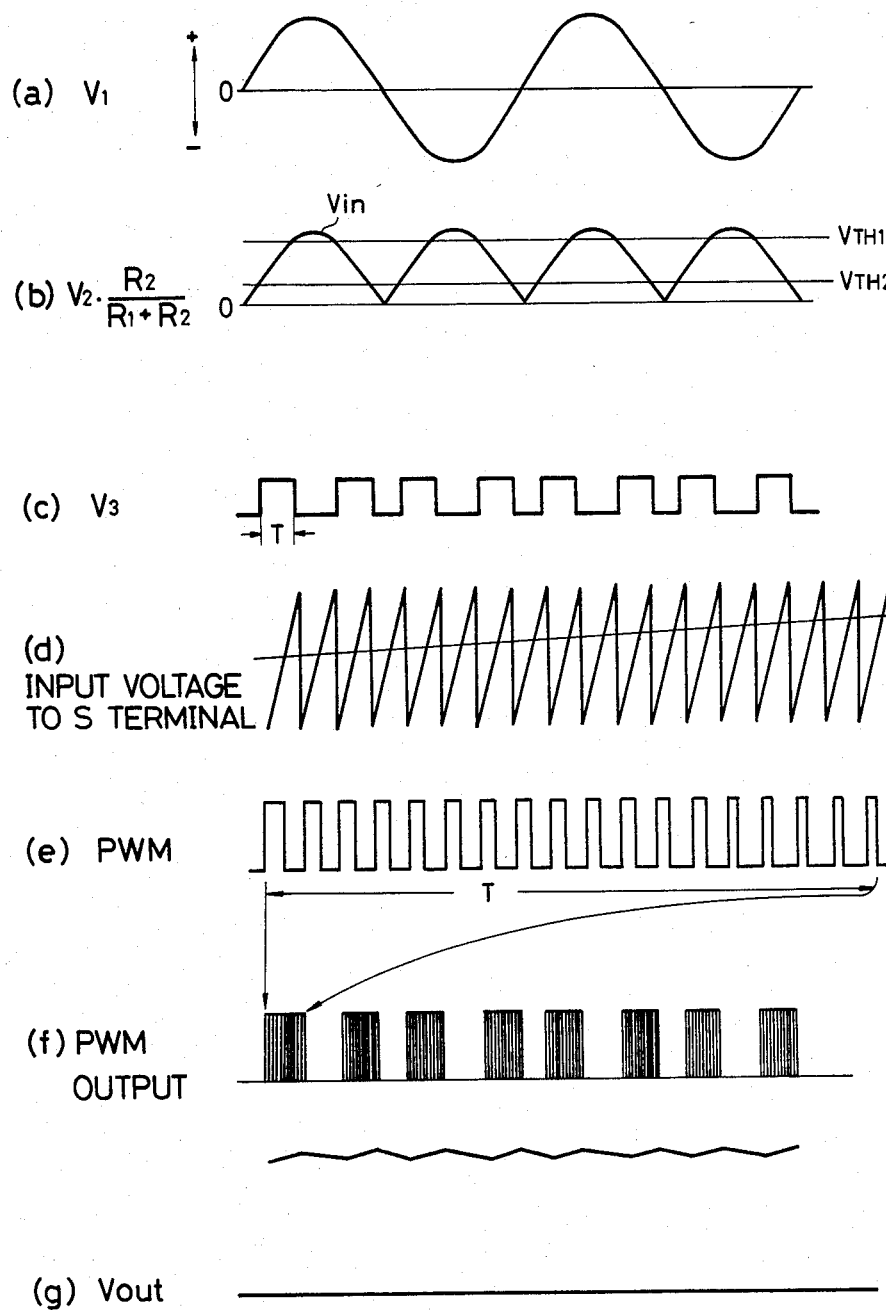
FIGS. 2 (a) through (g) are waveform diagrams useful for explaining the operation of the circuit shown in FIG. 1.

The output of the comparator 5 is connected to supply its output voltage $V_3$ to an inhibit input I of a pulse width modulating circuit ( also referred to as a PWM circuit, hereinafter ) 6 which is connected to supply a pulse width modulating signal to a switching circuit 7 which also receives as its input the voltage $V_2$ from the rectifier 2. As shown in FIG. 2 (c), the outout voltage $V_3$ from the comparator has either one of the two logic levels, high or low, and it is high when $V_{in}$ is smaller than or equal to $V_{TH1}$ and yet $V_{in}$ is greater than or equal to $V_{TH2}$. Other than that, the output voltage $V_3$ is low. The PWM circuit 6 controls the on/off condition of the switching circuit 7 in response to the state of the voltage $V_3$ supplied from the comparator 5. That is, when the voltage $V_3$ supplied to the inhibit input I of the PWM circuit 6 is high, then the PWM circuit 6 supplies a pulse width modulating signal to cause the switching circuit 7 turned on; on the other hand, when the voltage $V_3$ is low, then the switching circuit 7 is turned off in response to a signal from the PWM circuit 7.

As shown, the output of the switching circuit 7 is connected to supply an output voltage $V_4$ to one end of the primary winding of a pulse transformer $T_1$. The other end of the primary winding is connected to one output terminal of the full-wave rectifier 2. Both ends of the secondary winding of the transformer $T_1$ are connected to inputs of the other full-wave rectifier 8 which is connected to a filter circuit comprised of an inductor $L_1$ and a capacitor $C_3$ and also connected to an output voltage detector 9. A desired d.c. output voltage $V_{out}$ may be obtained across the capacitor $C_3$. The output voltage detector 9 is connected to supply its output to a photocoupler 10 which is then connected to supply its output to terminal S of the PWM circuit 6, which is also connected to receive a reference voltage $V_{ref}$ from a suitable voltage source ( not shown ). Provision of the photocoupler 10 allows to electrically isolate the primary side of the transformer $T_1$ from its secondary side. It is to be noted that the elements indicated by blocks in the circuit of FIG. 1 may be formed by any conventional means known for those skilled in the art.

As mentioned above, the output voltage $V_{out}$ detected by the detector 9 is supplied to the terminal S of the PWM circuit 6 through the photocoupler 10. If the input voltage to the terminal S of the PWM circuit 6 varies linearly as indicated in FIG. 2(d), then this input voltage is compared with a high-frequency saw toothed wave in the PWM circuit 6 to provide a pulse train output having the pulse width which is inversely proportional to the level of the input voltage to the terminal S, as shown in. FIG. 2(e). It is to be noted that the time scale in FIGS. 2(d) and 2(e) is shown as stretched for the purpose of illustration, and the time length T in FIG. 2(e) corresponds to the pulse width T of the voltage pulse train $V_3$.

As the voltage pulse train $V_3$ is applied to the inhibit input I, the PWM circuit 6 supplies its output signal as shown in FIG. 2(f). Since the saw toothed wave to be compared with the input voltage to the terminal S has a constant frequency, if the pulse width T during which the voltage $V_3$ is maintained high is constant, then the number of output pulses supplied from the PWM circuit 6 is unchanged, so that the wider the pulse width of the output signal from the PWM circuit 6, the higher the rectified and filtered output voltage $V_{out}$ at the secondary side of the transformer $T_1$. This then pushes the input voltage to the terminal S higher, which, in turn, causes the pulse width of the output signal from the PWM circuit 6 narrower thereby lowering the output voltage $V_{out}$. In this manner, the output voltage $V_{out}$ is controlled at a constant level determined by the reference voltage $V_{ref}$ which is applied to the PWM circuit 6, as shown in FIG. 2(g).

With the above-described structure, the ripple frequency of the output voltage $V_{out}$ may be made four times the frequency of the raw input voltage to the present switching regulator, so that the capacitance of the filtering capacitor $C_3$ may be made substantially smaller, and moreover use may be made of a significantly smaller pulse transformer $T_1$ because it is operated at high frequencies.

Figure 3:
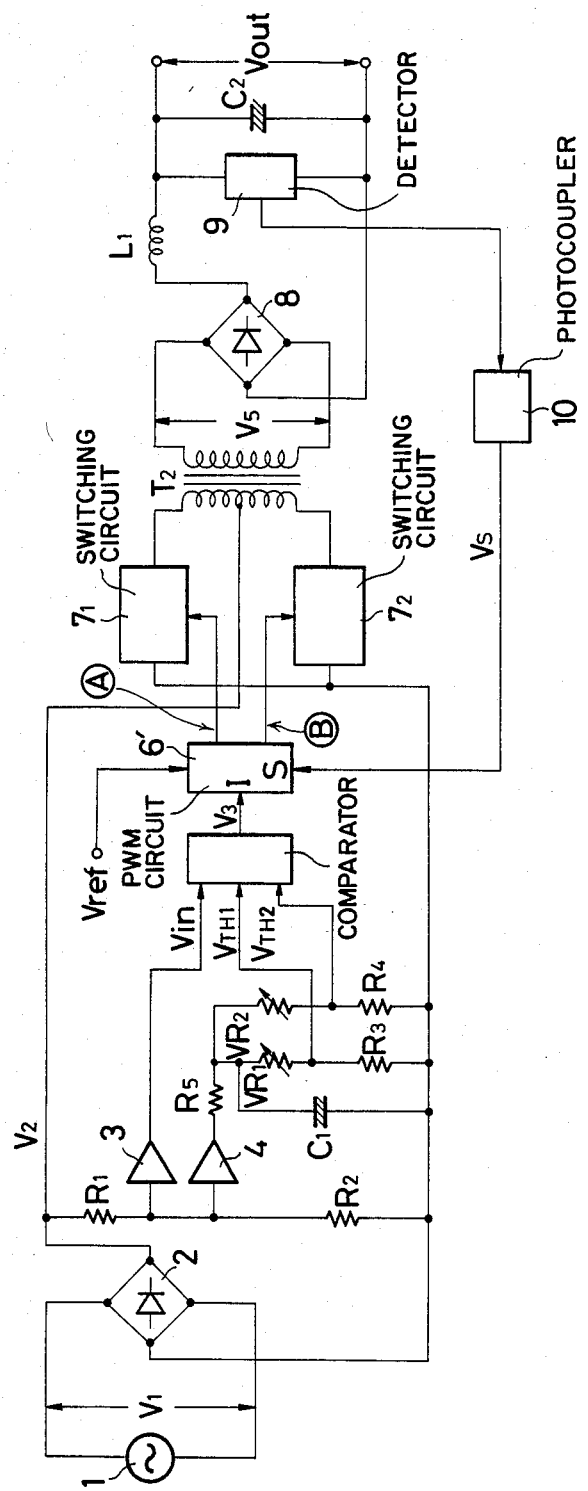
FIG. 3 is a circuit diagram showing the switching regulator constructed in accordance with another embodiment of the present invention.

FIG. 3 shows another embodiment of the present invention which is substantially the same in structure as the above-described first embodiment excepting that use is made of a push-pull type transformer $T_2$ instead of the single-ended type transformer $T_1$ of FIG. 1. Accordingly, in FIG. 3, like reference characters are employed to indicate like elements shown in FIG. 1 and a detailed explanation for each of these elements will not be repeated hereinbelow. As shown in FIG. 3, one of the outputs of the diode bridge full-wave rectifier 2 is connected to supply the rectified voltage $V_2$ to the center tap of the primary winding of the push-pull type pulse transformer $T_2$. The other output of the rectifier 2 is connected to one input of each of switching circuits $7_1$ and $7_2$. Each of the switching circuits $7_1$ and $7_2$ is provided with the other input to receive a corresponding PWM output A or B from the PWM circuit 6'.

The switching regulator of FIG. 3 includes the PWM circuit 6' which is structurally different from the PWM circuit 6 of FIG. 1. That is, in the PWM circuit 6', the high-frequency saw toothed reference voltage $V_{ref}$ and the input voltage $V_s$ to the input terminal S are differentially amplified, and if the algebraic sum of $V_{ref}-V_s$ is positive, then a pulse having a wider pulse width is supplied; on the other hand, if the algebraic sum of $V_{ref}-V_s$ is negative, then a pulse having a narrower pulse width is supplied, continuously varying the pulse width inbetween. The PWM circuit 6' supplies one of its output signals A and B alternately for each single cycle of the saw toothed waveform signal, and thus these output signals A and B are out of phase by 180 degrees from each other.

Similarly with FIGS. 2(d) and 2(e), the time scale is shown as stretched in FIGS. 4(e) and 4(f) for the purpose of illustration, and the time length T in FIG. 4(e) corresponds to the pulse width T of the voltage signal $V_3$. During the time period in which the voltage signal $V_3$ supplied to the inhibit terminal I of the PWM circuit 6' from the comparator 5 is maintained high, either one of the PWM output signals A and B is alternately supplied to the corresponding switching circuit $7_1$ or $7_2$. In this manner, since the switching circuits $7_1$ and $7_2$ are alternately turned on, the output voltage obtained across the secondary winding of the pulse transformer $T_2$ will be as shown in FIG. 4(g). And thus the diode bridge rectifier 8 will produce a rectified voltage as shown in FIG. 4(h). It is to be noted that the PWM output signals A and B are out of phase from each other by 180 degrees and a dead time period is provided between them, so that the signals A and B are prevented from being supplied to the respective switching circuits $7_1$ and $7_2$ at the same time.

Also in the case of FIG. 3, since the number of PWM output pulses during the time period while the signal $V_3$ is maintained high is unchanged, when the output voltage $V_{out}$ goes up to increase $V_3$, the pulse width of each of the PWM output pulses is made narrower to pull down the output voltage; on the other hand, when the output voltage $V_{out}$ goes down, the pulse width of each of the PWM output pulses is increased to push up the output voltage. As a result, the output voltage $V_{out}$ is maintained at constant. It is to be noted that in this embodiment a still smaller-sized transformer may be used because the transformer T₂ is of the push-pull type.

While the above provides a full and complete disclosure of the preferred embodiments of the present invention, various modifications, alternate constructions and equivalents may be employed without departing from the true spirit and scope of the invention, Therefore, the above description and illustration should not be construed as limiting the scope of the invention, which is defined by the appended claims.

What is claimed is:

1. A power supply circuit for converting an a.c. input voltage into a d.c. output voltage comprising:
   first rectifying means which receives said a.c. input voltage and supplies across its first and second outputs a first rectified voltage rectified from said a.c. input voltage;
   a transformer having a primary winding and a secondary winding;
   switching means connected between the first output of said first rectifying means and one end of the primary winding the other end of which is connected to the second output of said first rectifying means;
   second rectifying means connected to receive the voltage induced across the secondary winding of said transformer for supplying across its first and second outputs a second rectified voltage;
   first filter means for filtering said second rectified voltage to generate said d.c. output voltage;
   level-shift means connected to receive said first rectified voltage for producing a varying voltage which is proportional to said first rectified voltage, a first threshold voltage and a second threshold voltage which is lower in level than said first threshold voltage;
   comparator means connected to receive said varying voltage and said first and second threshold voltages for supplying a comparator output signal which is either high or low depending upon whether said varying voltage is inbetween said first and second threshold voltages or not; and
   pulse width modulating means having a first input for receiving a detecting signal indicating the level of said d.c. output voltage, a second input for receiving a reference signal and a third input for receiving said comparator output signal, said pulse width modulating means supplying a pulse width modulated output signal to said switching means only when said comparator output signal received is high.

2. A power supply circuit as in claim 1 wherein at least one of said first and second rectifying means includes a full wave rectifier.

3. A power supply circuit as in claim 2 wherein said full wave rectifier is a diode bridge rectifier.

4. A power supply circuit as in claim 1 wherein said level-shift means includes a voltage divider comprised of first and second resistors connected in series between the first and second outputs of said first rectifying means; a first buffer amplifier having its input connected to the junction between said first and second resistors and its output connected to supply said varying voltage to said comparator means; and a second buffer amplifier having its input connected to the junction between said first and second resistors and its output connected to threshold producing means.

5. A power supply circuit as in claim 1 wherein said first filter means includes a first inductor and a first capacitor which are connected in series between said first and second outputs of said second rectifying means whereby said d.c. output voltage is supplied across said first capacitor.

6. A power supply circuit as in claim 1 wherein said comparator output signal is high only when said varying signal is inbetween said first and second threshold voltages.

7. A power supply circuit as in claim 1 further comprising detecting means for detecting said d.c. output voltage to produce said detecting signal and feed-back means for supplying said detecting signal to said pulse modulating means.

8. A power supply circuit as in claim 7 wherein said feed-back means includes a photo-coupler thereby electrically isolating the primary side of said transformer from its secondary side.

9. A power supply circuit as in claim 1 wherein said reference signal is a high-frequency saw toothed waveform signal.

10. A power supply circuit for converting an a.c. input voltage into a d.c. output voltage comprising:
    first rectifying means which receives said a.c. input voltage and supplies across its first and second outputs a first rectified voltage rectified from said a.c. input voltage;
    a transformer having a primary winding provided with a center tap connected to said first output of said first rectifying means and a secondary winding;
    first switching means connected between said first output of said first rectifying means and one end of said primary winding;
    second switching means connected between said second output of said first rectifying means and the other end of said primary winding;
    second rectifying means connected to receive the voltage induced across the secondary winding of said transformer for supplying across its first and second outputs a second rectified voltage;
    first filter means for filtering said second rectified voltage to generate said d.c. output voltage;
    level-shift means connected to receive said first rectified voltage for producing a varying voltage which is proportional to said first rectified voltage, a first threshold voltage and a second threshold voltage which is lower in level than said first threshold voltage;
    comparator means connected to receive said varying voltage and said first and second threshold voltages for supplying a comparator output signal which is either high or low depending upon whether said varying voltage is inbetween said first and second threshold voltages or not; and
    pulse width modulating means having a first input for receiving a detecting signal indicating the level of said d.c. output voltage, a second input for receiving a reference signal and a third input for receiving said comparator output signal, said pulse width modulating means supplying first and second pulse width modulated output signals, which are out of phase from each other by 180 degrees, alternately to said first and second switching means only when said comparator output signal received is high.

11. A power supply circuit as in claim 10 wherein at least one of said first and second rectifying means includes a full wave rectifier.

12. A power supply circuit as in claim 11 wherein said full wave rectifier is a diode bridge rectifier.

13. A power supply circuit as in claim 10 wherein said level-shift means includes a voltage divider comprised of first and second resistors connected in series between the first and second outputs of said first rectifying means; a first buffer amplifier having its input connected to the junction between said first and second resistors and its output connected to supply said varying voltage to said comparator means; and a second buffer amplifier having its input connected to the junction between said first and second resistors and its output connected to threshold producing means.

14. A power supply circuit as in claim 10 wherein said first filter means includes a first inductor and a first capacitor which are connected in series between said first and second outputs of said second rectifying means whereby said d.c. output voltage is supplied across said first capacitor.

15. A power supply circuit as in claim 10 wherein said comparator output signal is high only when said varying signal is inbetween said first and second threshold voltages.

16. A power supply circuit as in claim 10 further comprising detecting means for detecting said d.c. output voltage to produce said detecting signal and feed-back means for supplying said detecting signal to said pulse modulating means.

17. A power supply circuit as in claim 16 wherein said feed-back means includes a photo-coupler thereby electrically isolating the primary side of said transformer from its secondary side.

18. A power supply circuit as in claim 10 wherein said reference signal is a high-frequency saw toothed waveform signal.

* * * * *